(12) United States Patent
Kozak et al.

(10) Patent No.: US 7,073,416 B2
(45) Date of Patent: Jul. 11, 2006

(54) 3-POINT/5-POINT FASTENER, 3-POINT/5-POINT BIT

(75) Inventors: Burton Kozak, Chicago, IL (US); Ira M. Kozak, Chicago, IL (US)

(73) Assignee: Eazypower Corporation, Chicago, IL (US)

( * ) Notice: Subject to any disclaimer, the term of this patent is extended or adjusted under 35 U.S.C. 154(b) by 0 days.

(21) Appl. No.: 10/932,436

(22) Filed: Sep. 2, 2004

(65) Prior Publication Data

US 2006/0042429 A1    Mar. 2, 2006

(51) Int. Cl.
B25B 23/00    (2006.01)
(52) U.S. Cl. .......................................... 81/460; 81/461
(58) Field of Classification Search ................. 81/460; 411/402, 403, 404, 405
See application file for complete search history.

(56) References Cited

U.S. PATENT DOCUMENTS

| | | | | |
|---|---|---|---|---|
| 2,046,837 A * | 7/1936 | Phillips | ........................ | 81/460 |
| 2,397,216 A * | 3/1946 | Stellin | ........................ | 411/404 |
| 2,445,978 A * | 4/1948 | Stellin | ........................ | 411/404 |
| 3,658,105 A * | 4/1972 | Burt et al. | ..................... | 81/460 |
| 3,872,904 A * | 3/1975 | Barlow | ........................ | 81/460 |
| 4,430,035 A * | 2/1984 | Rodseth | ....................... | 411/402 |
| 4,938,731 A * | 7/1990 | Nguyen et al. | ............. | 464/158 |
| 5,171,117 A * | 12/1992 | Seidl | ........................... | 411/404 |
| D413,254 S | 8/1999 | Lee | | |
| D414,402 S | 9/1999 | Lee | | |
| 6,293,745 B1 | 9/2001 | Lu | | |
| 6,402,449 B1 | 6/2002 | Lin | | |
| D472,434 S * | 4/2003 | Trempala | ...................... | D8/21 |
| 6,626,627 B1 | 9/2003 | Oesterle | | |
| 2002/0017170 A1* | 2/2002 | Amis | ........................ | 81/121.1 |

* cited by examiner

Primary Examiner—David B. Thomas
Assistant Examiner—Robert Scruggs
(74) Attorney, Agent, or Firm—Cherskov & Playnik (57) ABSTRACT

The present invention provides a fastener that can be used with a variety of bits as well as a fastener with several security features that can be used only with a very specialized bit and, also, a fastener/bit combination that can be used in conjunction with high-torque power tools. Specifically, this invention allows the use of a straight blade, a three-blade or a five-blade driver with the same fastener head.

36 Claims, 6 Drawing Sheets

3-POINT/5-POINT FASTENER, 3-POINT/5-POINT BIT

FIELD OF THE INVENTION

The present invention relates to the field of inserting and removing threaded fasteners into and out of a workpiece and, more specifically, this invention relates to fastener drivers having three or five blades.

BACKGROUND OF THE INVENTION

There are a wide variety of threaded fastener heads and matching drivers. Typical fastener heads have recesses to mate with drivers configured as a straight blade, Phillips, Allen, TORX™, three-blade, or five-blade bit. The wide availability of different fastener head configurations requires that a worker have on hand a corresponding variety of driver bits.

Given the availability of high torque power driving tools, there is a widely felt need for fastener-head/driver-bit combinations wherein the head and the bit are comparable in bulk, so that neither will suffer a larger deformation than the other when a large torque is applied to the bit.

Moreover, for reasons of safety or security, many manufacturers find it necessary to utilize fasteners such that an unauthorized individual is unlikely to have a corresponding driver bit.

Recent patents address some of the above concerns. U.S. Pat. No. 6,626,627B2 to Oesterle et al. discloses an unusually shaped head which is rotated by means of a hexagonal socket; U.S. Pat. No. 6,402,449B1 to Lin discloses a head with a polygonal recess comprising stress-relieving notches at each corner; U.S. Pat. No. 6,293,745B1 to Lu discloses a head comprising overlapping recesses therein; U.S. Pat. Des. 414,402 to Lee discloses a head with a polygonal recess comprising three intersecting slots; and U.S. Pat. Des. 413,254 to Lee discloses a head with curvilinear recesses therein.

A need exists in the art for a unique bit for engaging with a variety of fastener head configurations. This bit should be usable with both hand and power tools.

A need also exists in the art for fasteners that can be manipulated with a variety of bits as well as a need for fasteners that can be used only with a very specialized bit. Furthermore, such fasteners should be usable with high-torque power tools.

SUMMARY OF THE INVENTION

An object of the present invention is to provide a novel fastener-head/driver-bit combination that overcomes many disadvantages of the prior art.

Another object of the present invention is to provide a fastener adapted to receive a variety of drivers. A feature of the present invention is that it comprises a fastener head adapted to receive straight-blade, 3-blade, and 5-blade driver bits. An advantage of the present invention is that a variety of drivers can rotate the invented fastener head.

Yet another object of the present invention is to provide a fastener-head/driver-bit combination for use with high-torque and/or high rpm power tools. A feature of the present invention is a fastener head that can receive a massive 3-blade driver tip compared to typical bit tips. An advantage of the present invention is that a worker can work more efficiently by using high-torque power tools.

Yet a further object of the present invention is to provide a fastener-driver bit for use with high-torque and/or high rpm power tools. A feature of the present invention is that it comprises a very massive 3-blade driver tip. An advantage of the present invention is that a worker can work more efficiently by using high-torque power tools.

Still another object of the present invention is to provide a high security fastener-head/driver-bit combination. A feature of the present invention is that it discloses a fastener head with several security features such as a central pin, bit-receiving slots terminating short of the periphery of the fastener head or at a wall located at said periphery, and unequal angles between slots. An advantage of the present invention is that these fastener heads can be rotated only by a specially designed bit.

In brief, the present invention provides a fastener and fastener-driver combination, the combination comprising: a fastener having a threaded shank and a head, said head comprising a periphery, a center, and three convex regions separated by a first slot, a second slot, and a third slot extending radially from said center wherein said slots each have a longitudinal axis, and with angles of between 120 and 144 degrees between the first slot longitudinal axis and the second slot longitudinal axis and between the second slot longitudinal axis and the third slot longitudinal axis; and a 3-blade fastener driver having a first blade, a second blade, and a third blade, with each said blade having a longitudinal axis; and with said blades configured to be received by said slots.

BRIEF DESCRIPTION OF THE DRAWING

The invention together with the above and other objects and advantages will best be understood from the following detailed description of the preferred embodiment of the invention shown in the accompanying drawing, wherein.

DETAILED DESCRIPTION OF THE INVENTION

The present invention provides a fastener that can be used with a variety of fastener driver bit tips. The present invention also provides a fastener with several security features that can be used only with a very specialized bit. Also provided is a fastener/bit combination which can be used in conjunction with high-torque power tools.

Figure 1:
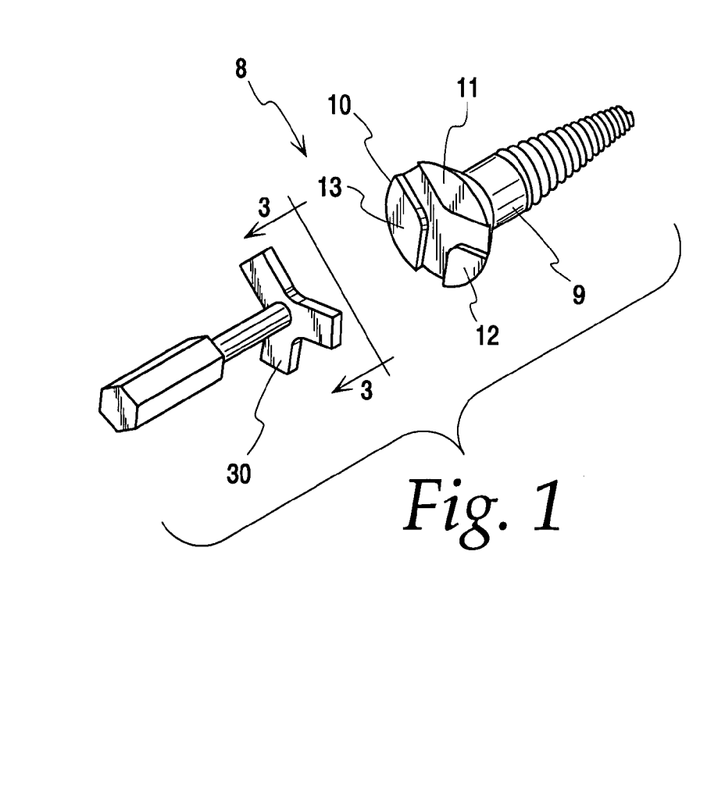
FIG. 1 is a perspective view of a fastener head and fastener-driver combination, in accordance with features of the present invention.

This invention allows the use of a straight blade, a three-blade or a five-blade driver with the same fastener head. FIG. 1 provides a perspective schematic view of the invented combination (designated as numeral 8) of the fastener bit 30 and the fastener head 10.

A High-Torque Three-Blade Fastener/driver Combination.

Figure 2:
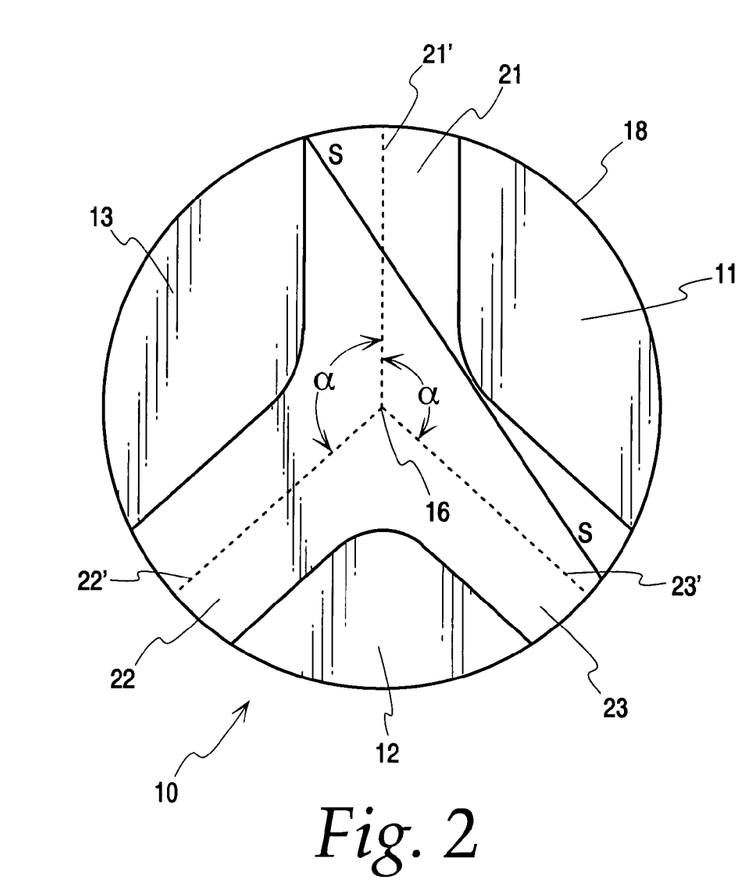
FIG. 2 is a schematic top view of a fastener head, in accordance with features of the present invention

As depicted in FIGS. 1 and 2 the invented fastener head, designated as numeral 10, comprises three regions 11, 12, 13 defining three slots: a first slot 21, a second slot 22, and a third slot 23. The longitudinal axes of the slots extend radially from the center 16 of the fastener head 10 so as to extend along lines that are generally perpendicular to the axis of the fastener.

The fastener head 10 may define a periphery 18 with a predetermined shape (circular, square, hexagonal, etc . . . ). The center 16 is aligned with the longitudinal axis of the fastener. The use of a non-circular periphery facilitates imparting additional azimuthal torque to the fastener head via a wrench, socket, pliers, etc . . .

The radially extending slots 21, 22, 23 are configured such that a 3-blade driver, each blade 120 degrees apart from the other, may be inserted therein. Moreover, given the first slot 21 with a longitudinal axis 21', the second slot 22, with a longitudinal axis 22', and the third slot 23, with a longitudinal axis 23', the angles α between 21' and 22' and between 21' and 23' can range between 130 and 135 degrees.

The slots 21, 22, and 23, are configured to be especially wide, between one tenth and one third of the diameter of the fastener head. Because of the especially chosen large width of the radial slots, a variety of drivers may be used to engage the fastener head. The fastener head 10 may accommodate a variety of drivers, for example: 1) a three blade driver with blades 120 degrees apart; 2) 3-blade drivers wherein two of the angular spacings between blades are between 120 and 144 degrees; 3) a 3-blade driver configured to fit snugly in the wide-slot fastener head; and 4) a straight blade driver inserted at the line S—S in FIG. 2.

Figure 3:
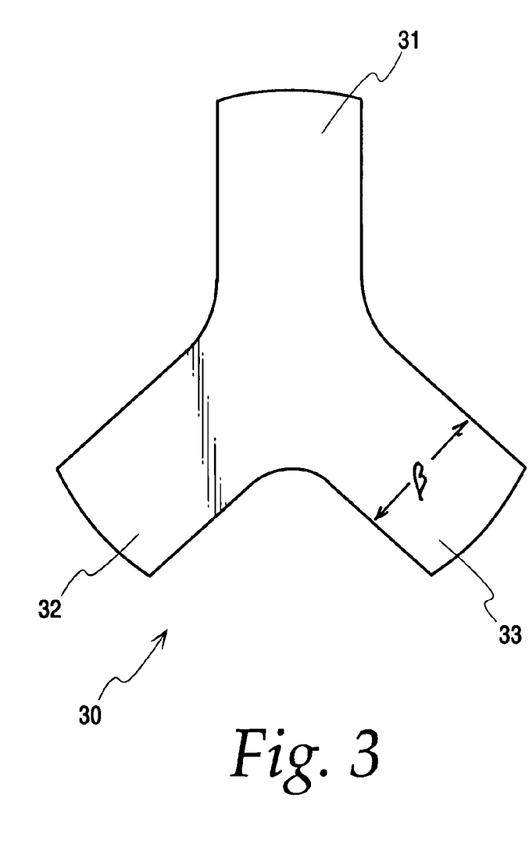
FIG. 3 is a schematic view of a fastener driver bit tip, taken along line 3—3 in FIG. 1, in accordance with features of the present invention.
Figure 4A:
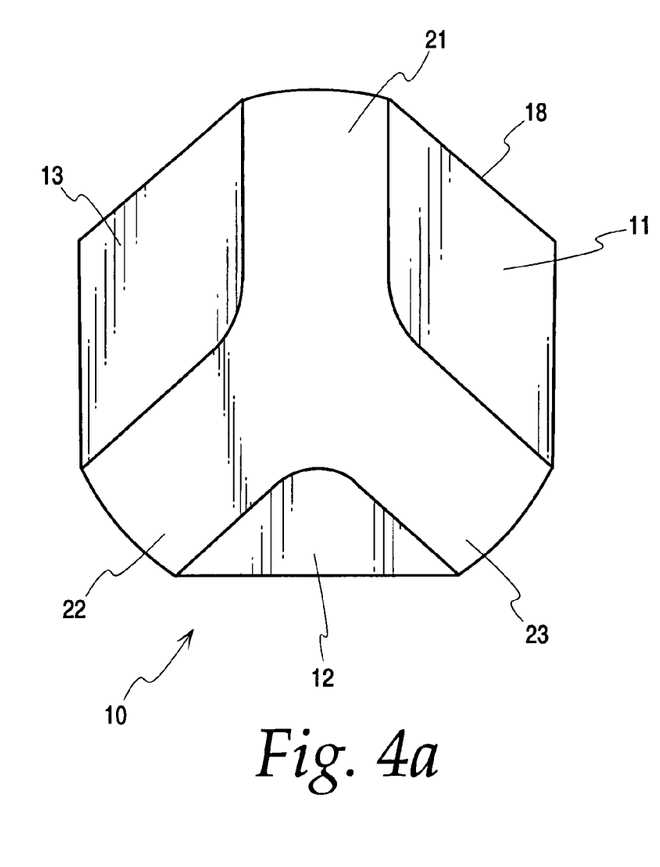
FIG. 4a is a schematic view of an alternative fastener head, in accordance with features of the present invention.
Figure 4B:
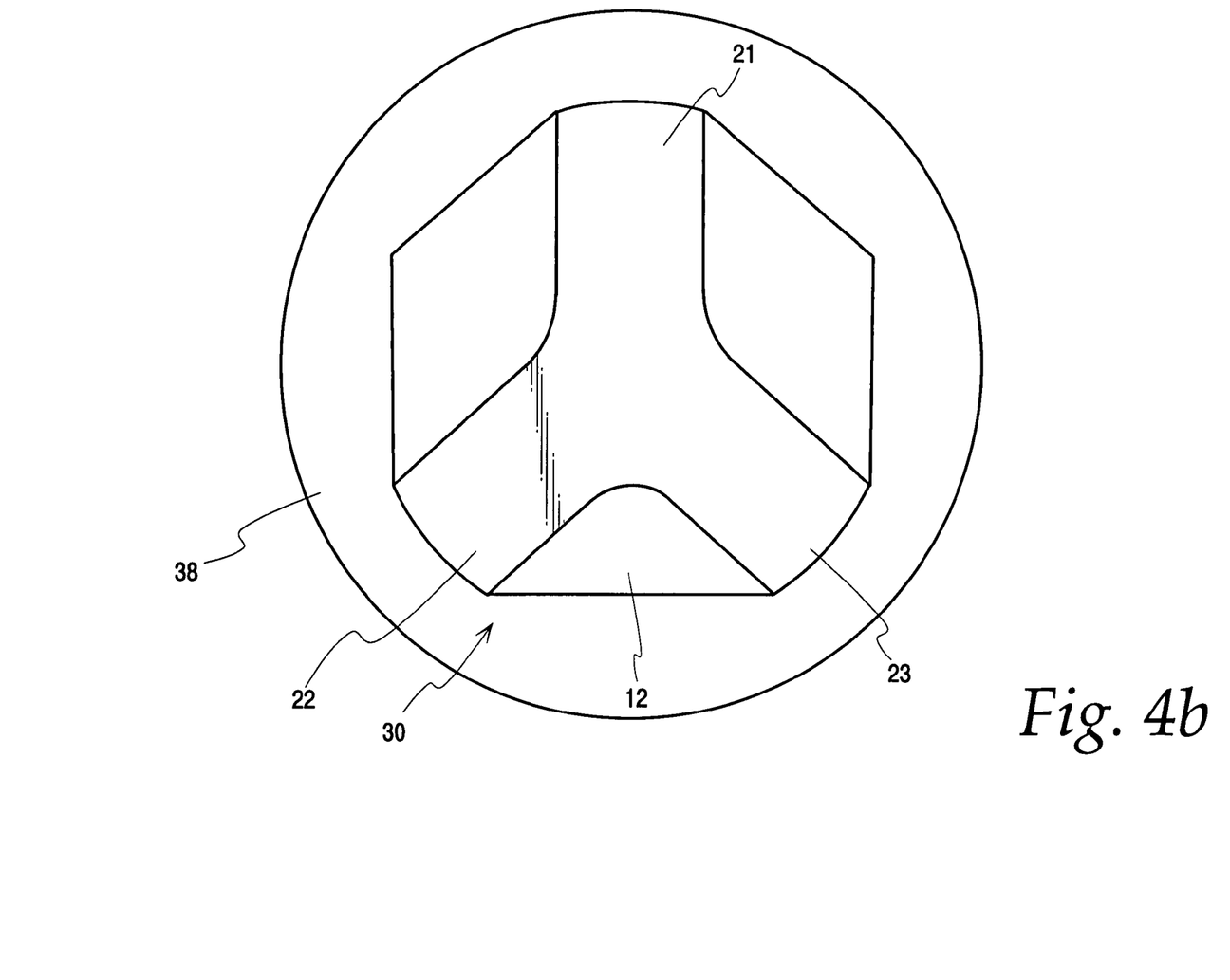
FIG. 4b is a schematic view of an alternative fastener driver bit tip, in accordance with features of the present invention.

Depicted in FIG. 3 is a three-blade driver 30 configured to be snugly received in the fastener head 10. A means for providing snug (friction fit) between the bit and the fastener head 10 comprises blades, each of which has breadth (designated as β in FIG. 3) that is equal to between one tenth and one third the diameter of the fastener head. The angles between blades 31 and 32 and between blades 31 and 33 are both the same as the angles chosen between axes 21' and 22' and between axes 21' and 23'. Given that the regions 11, 12, 13 of the fastener head and the driver blades 31, 32, 33 are approximately equally massive, the head/driver combination disclosed here facilitates the application of a large amount of torque to the driver, approximately thirty percent more than in presently available configurations, without deforming either the head or the driver. Furthermore, where the periphery 18 of the fastener head 10 depicted in FIG. 4a is not circular, the driver may include a socket 38, depicted in FIG. 4b, conformed to fit snugly around the periphery 18 of the fastener head. Advantages of the socket include the ability to transfer a large amount of torque from the bit to the periphery of the fastener head thereby reducing the amount of stress applied to the slots in the fastener head.

A High-Security Three-Blade Fastener/Driver Combination.

Figure 5A:
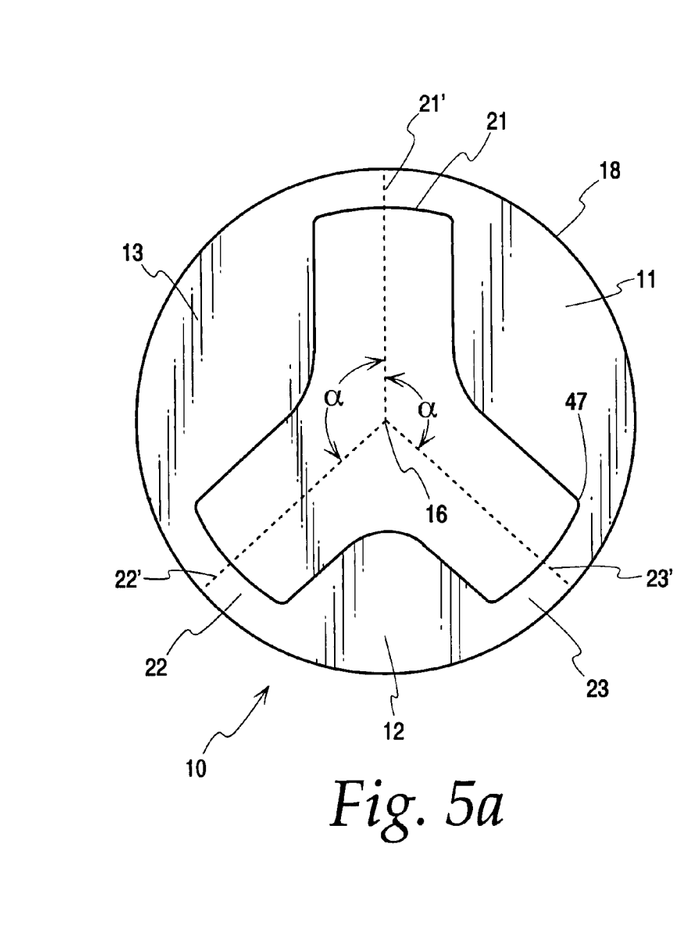
FIG. 5a is a schematic top view of an alternative fastener head, in accordance with features of the present invention.
Figure 5B:
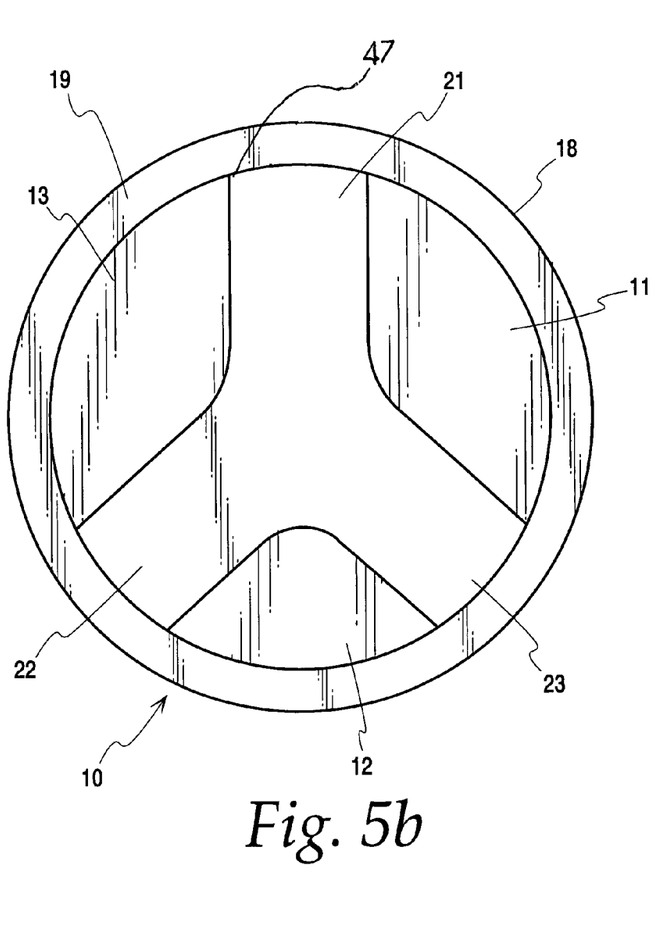
FIG. 5b is a schematic top view of an alternative fastener head, in accordance with features of the present invention.

Under many circumstances, it is necessary to limit access to a fastener head by preventing engagement of the fastener head with a tool other than a specifically designed bit. FIGS. 5a, 5b, 5c, and 5d depict modifications of the fastener head depicted in FIG. 2 that make it impossible for various standard tools to engage that modified fastener head. Specifically, the invented fastener head prevents standard blades from fully nesting within the fastener cavities. In FIG. 5a, each of the radially extending slots 21, 22, and 23 terminates prior to breaching the periphery 18 of the fastener head. In FIG. 5b, each of the slots 21, 22, and 23 abuts against a wall 19 (located at the periphery 18 of the fastener head) which may be made to project in an axial direction and above the protruding regions 11, 12, and 13. The wall surrounds the fastener head so that at least one slot terminates prior to reaching, or is obstructed at a region inwards of, the periphery. Only one of the slots need be blocked to enable this security feature. Also, the distal-most ends 47 of the slots (i.e. the ends formed by the transversely extending walls running perpendicular to the longitudinal axes of the slots) may be rounded off or otherwise configured to a unique shape.

Figure 5C:
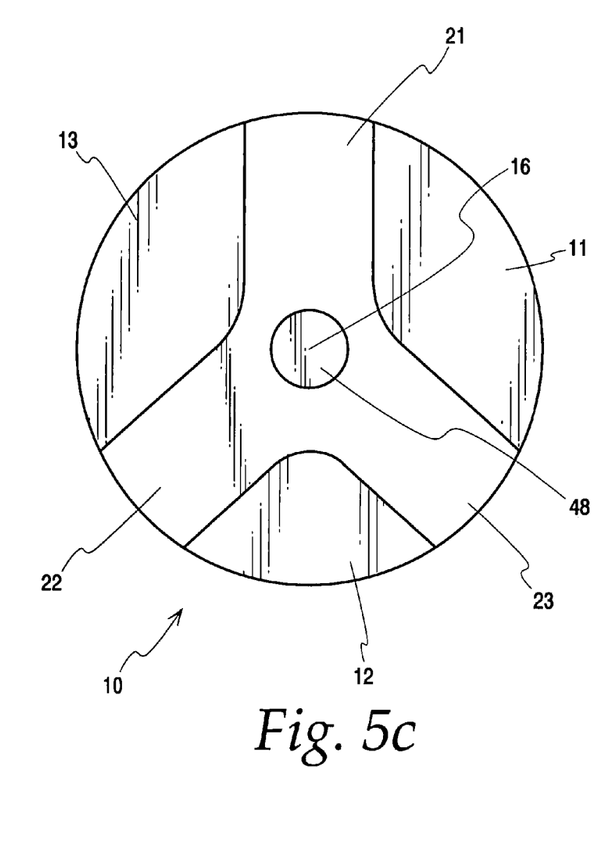
FIG. 5c is a schematic top view of an alternative fastener head, in accordance with features of the present invention.

Alternatively, and as depicted in FIG. 5c, the fastener head comprises a post 48 protruding parallel to the axis of the fastener and, optionally, coaxial to longitudinal axis of the fastener head. This post may have any of a variety of cross-sections: circular, square, elliptical, hexagonal, etc. The use of a non-circular cross-section for the post 48 facilitates imparting additional torque to the fastener head 10.

Figure 5D:
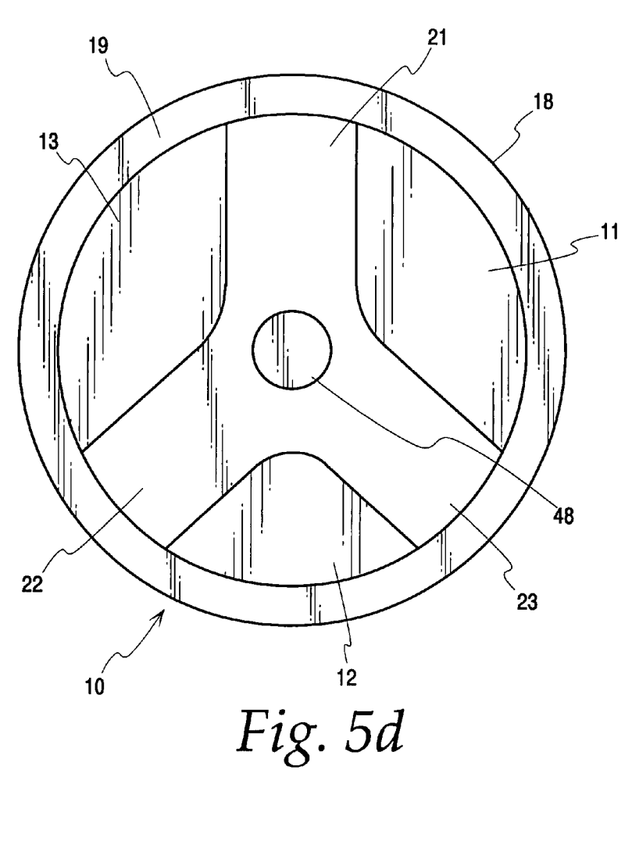
FIG. 5d is a schematic top view of an alternative fastener head, in accordance with features of the present invention.

A fastener removal bit intended for use in conjunction of the fastener head with a post 48 requires a center aperture adapted to receive the post 48. FIG. 5d illustrates a fastener head that combines the features of the fastener heads depicted in FIGS. 5b and 5c.

Figure 5E:
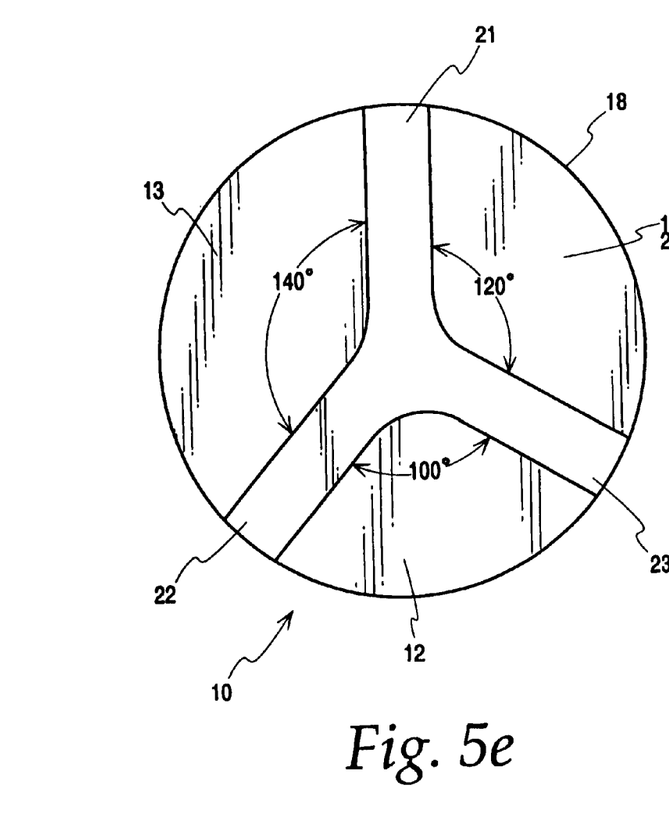
FIG. 5e is a schematic top view of an alternative fastener head, in accordance with features of the present invention.

Added security is provided when the angles between adjacent longitudinal axes of the slots of the fastener head are all different, as depicted in FIG. 5e, and especially if the slots 21, 22, and 23 are made narrower. For instance, the angles between 21 and 22, 22 and 23, and 23 and 21 may be chosen to be 140, 100, and 120 degrees, respectively.

The invented high security head/driver combination includes drivers designed to be received snugly by the fastener head 10 as described herein and depicted in FIGS. 5a, 5b, 5c, and 5d.

A Three-Blade/Five-Blade Fastener Head.

Figure 6:
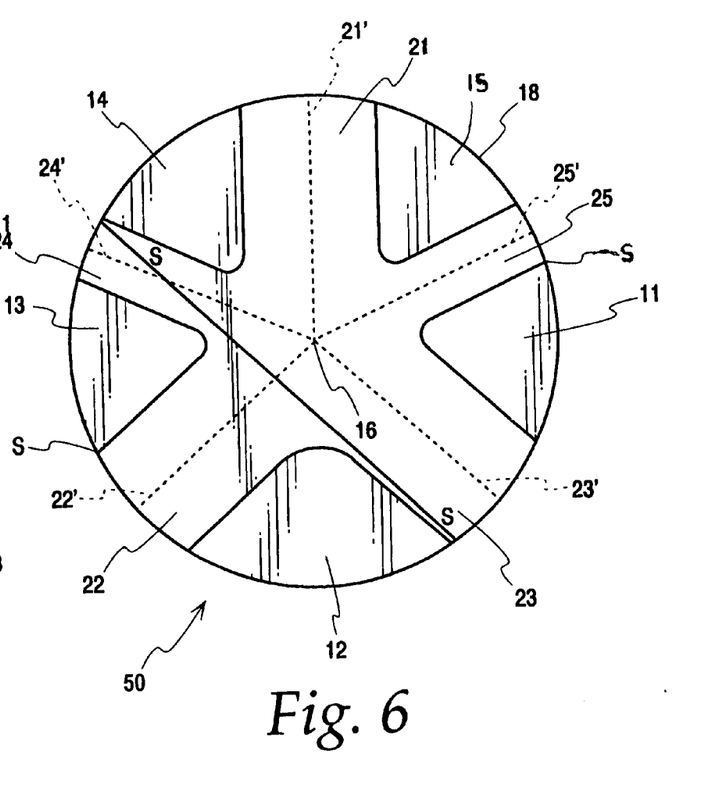
FIG. 6 is a schematic top view of an alternative fastener head, in accordance with features of the present invention.

As depicted in FIG. 6 an alternative fastener head configuration, designated as numeral 50, comprises five topographically raised (i.e. convex) regions 11, 12, 13, 14, and 15 separated by five radial slots 21, 22, 23, 24, and 25 extending from the center 16 of the fastener head. The fastener head 50 may have a periphery 18 with a variety of shapes (circular, square, hexagonal, etc . . . ), with the center 16 of the fastener head aligned with the axis of the screw thread. The use of a non-circular periphery facilitates imparting torque to the fastener head. The slots 21, 22, 23 are so configured that a 3-blade driver, each pair of blades 120 degrees apart, may be inserted therein. Moreover, given a first slot 21 with a longitudinal axis 21', a second slot 22, with a longitudinal axis 22', and a third slot 23, with a longitudinal axis 23', the angles between 21' and 22' and between 21' and 23' are both between 130 and 135 degrees.

The widths of the slots 21, 22, and 23, are especially wide, equal to between one tenth and one third the diameter of the fastener head and preferably one fourth the diameter of the fastener head. Thus, given a 3-blade driver 30 with a first blade 31, a second blade 32, and a third blade 33, (see FIG. 3), the five-slot fastener head 50 may accommodate the driver 30 provided that the angle between the first and second blades is between 120 and 144 degrees and the angle between the first and third blades is also between 120 and 144 degrees. Furthermore, slots 24 and 25 are so configured that their respective longitudinal axes 24' and 25' are at 72 degrees to the longitudinal axis 21' of slot 21.

The fastener head 50 can accommodate a five-blade driver, with the angle between blades being uniformly 72 degrees as well as a three-blade driver with the angle between blades being uniformly 120 degrees. The fastener 50 can also accommodate the thick-blade three-blade driver depicted in FIG. 3.

In addition, the fastener head 50 is so configured as to receive a straight blade driver, for example within a region of the fastener head 50 defining a substantially rectilinear space, such as between points S—S of FIG. 6. The present invention also facilitates frictional engagement of a 5-blade complementary driver with said head 50 so as to result in a snug interaction between the driver and the head. Furthermore, where the periphery 18 of the fastener head 50 is not circular, the driver may include a socket conformed to contact and fit snugly around the periphery 18.

A High-Security Three-Blade/Five-Blade Fastener/Driver Combination.

Under many circumstances, it is necessary to limit access to a fastener head by eliminating the possibility that the fastener head will be engaged with a tool other than a tool specifically designed to engage the fastener head. The security features depicted in FIGS. 5a, 5b, 5c, and 5d can be added to the fastener head depicted in FIG. 6 so as to make it impossible for various tools to engage that fastener head. Specifically, the additional slots 24, 25 may each have a width of less than one fifth of said diameter.

The invented head/driver 3-blade/5/blade high security combination includes drivers designed to be received snugly by the fastener head 50.

While the invention has been described in the foregoing with reference to details of the illustrated embodiment, these details are not intended to limit the scope of the invention as defined in the appended claims.

The invention claimed is:

1. A fastener and fastener-driver combination, the combination comprising:
   a) a fastener having a threaded shank and a head, said head comprising a periphery, a center, and three convex regions separated by a first slot, a second slot, and a third slot extending radially from said center wherein said slots each have a longitudinal axis, such that in said head between the first slot and the second slot and between the second slot and the third slot there is an angular separation of between 130 and 135 degrees between their longitudinal axes; and
   b) a 3-blade fastener driver having a first blade, a second blade, and a third blade, with each said blade having a longitudinal axis; and with said blades configured to be received by said slots.

2. The fastener and fastener-driver combination as recited in claim 1 wherein said periphery defines a wall surrounding the fastener head so as to block one or more openings in the periphery created by the slots.

3. The fastener and fastener-driver combination as recited in claim 1 further comprising a post protruding from one of said slots and wherein said fastener-driver has a matching cavity configured to receive said post.

4. The fastener and fastener-driver combination as recited in claim 1 wherein said periphery has a diameter and wherein said slots each have a width between one tenth and one third of said diameter.

5. The fastener and fastener-driver combination as recited in claim 1 with said head further comprising two additional slots wherein said additional slots each have a longitudinal axis with a 72 degrees angular separation on either side of the longitudinal axis of the second slot and wherein said driver comprises five blades configured to be received in said head.

6. A fastener and fastener-driver combination, the combination comprising:
   a) a fastener having a threaded shank and a head, said head comprising a periphery, a center, and three convex regions separated by a first slot, a second slot, and a third slot extending radially from said center wherein said slots each have a longitudinal axis, with angles of between 120 and 144 degrees between the first slot longitudinal axis and the second slot longitudinal axis and between the second slot longitudinal axis and the third slot longitudinal axis; and
   b) a 3-blade fastener driver having a first blade, a second blade, and a third blade, with each said blade having a longitudinal axis; and with said blades configured to be received by said slots, wherein angles between adjacent longitudinal axes are different.

7. The fastener and fastener-driver combination as recited in claim 6 wherein said periphery defines a wall surrounding the fastener head so as to block one or more openings in the periphery created by the slots.

8. The fastener and fastener-driver combination as recited in claim 6 further comprising a post protruding from one of said slots and wherein said fastener-driver has a matching cavity configured to receive said post.

9. The fastener and fastener-driver combination as recited in claim 6 wherein said periphery has a diameter and wherein said slots each have a width between one tenth and one third of said diameter.

10. The fastener and fastener-driver combination as recited in claim 6 with said head further comprising two additional slots wherein said additional slots each have a longitudinal axis with a 72 degrees angular separation on either side of the longitudinal axis of the second slot and wherein said driver comprises five blades configured to be received in said head.

11. The fastener and fastener-driver combination as recited in claim 6 wherein said periphery is non-circular and said fastener-driver further comprises a socket adapted to receive said periphery.

12. A fastener and fastener-driver combination, the combination comprising:
   a) a fastener having a threaded shank and a head, said head comprising a periphery, a center, and three convex regions separated by a first slot, a second slot, and a third slot extending radially from said center wherein said slots each have a longitudinal axis, with angles of between 120 and 144 degrees between the first slot longitudinal axis and the second slot longitudinal axis and between the second slot longitudinal axis and the third slot longitudinal axis; and
   b) a 3-blade fastener driver having a first blade, a second blade, and a third blade, with each said blade having a longitudinal axis; and with said blades configured to be received by said slots, wherein said periphery is non-circular and said fastener-driver further comprises a socket adapted to contact said periphery to transfer torque to the periphery.

13. A fastener comprising a threaded shank and a head, said head comprising a periphery, a center, and three convex regions separated by a first slot, a second slot, and a third slot extending radially from said center wherein said slots each have a longitudinal axis, such that in said head between the first slot and the second slot and between the second slot and the third slot there is an angular separation of between 130 and 135 degrees between their longitudinal axes.

14. The fastener as recited in claim 9 wherein said periphery is non-circular.

15. The fastener as recited in claim 13 further comprising a wall defined by said periphery with said wall surrounding the fastener head so as to block one or more openings in the periphery created by the slots.

16. The fastener as recited in claim 13 wherein said periphery has a diameter and wherein said slots each have a width between one tenth and one third of said diameter.

17. The fastener as recited in claim 13 further comprising a post protruding in one of said slots.

18. The fastener as recited in claim 13, said head adapted to receive:
  a) a 3-blade driver with said blades each having a longitudinal axis, with the blade longitudinal axes 120 degrees apart;
  b) 3-blade drivers with a first blade, a second blade, and a third blade, with said blades each having a longitudinal axis, with angles of between 120 and 144 degrees between the first blade and the second blade longitudinal axes and between the second blade and the third blade longitudinal axes; and
  c) a straight blade driver.

19. The fastener as recited in claim 13 with said head further comprising two additional slots wherein said additional slots each have a longitudinal axis with a 72 degrees angular separation on either side of the longitudinal axis of the second slot.

20. The fastener as recited in claim 19 wherein said fastener head has slots adapted to receive a 3-blade driver, with blades 120 degrees apart, a 5-blade driver, with blades 72 degrees apart, or a straight blade driver.

21. A fastener-driver comprising a shank terminating at a center point, and a first blade, a second blade, and a third blade, extending radially from said center point, wherein said blades each have a longitudinal axis such that in said head between the first slot and the second slot and between the second slot and the third slot there is an angular separation of between 130 and 135 degrees between their longitudinal axes.

22. The fastener-driver as recited in claim 21 further comprising two additional blades emanating from said center point wherein said additional blades each have a longitudinal axis with a 72 angular separation on either side of the longitudinal axis of the second blade.

23. The fastener-driver as recited in claim 21 wherein said driver further comprises a socket emanating from said shaft.

24. The fastener-driver as recited in claim 21 further comprising a cavity at said center point.

25. A fastener comprising a threaded shank and a head, said head comprising a periphery, a center, and three convex regions separated by a first slot, a second slot, and a third slot extending radially from said center wherein said slots each have a longitudinal axis, wherein angles between adjacent longitudinal axes are different.

26. The fastener as recited in claim 25 wherein said periphery is non-circular.

27. The fastener as recited in claim 25 further comprising a wall defined by said periphery with said wall surrounding the fastener head so as to block one or more openings in the periphery created by the slots.

28. The fastener as recited in claim 25 wherein said periphery has a diameter and wherein said slots each have a width between one tenth and one third of said diameter.

29. The fastener as recited in claim 25 further comprising a post protruding in one of said slots.

30. The fastener as recited in claim 25, said head adapted to receive:
  a) a 3-blade driver with said blades each having a longitudinal axis, with the blade longitudinal axes 120 degrees apart;
  b) 3-blade drivers with a first blade, a second blade, and a third blade, with said blades each having a longitudinal axis, with angles of between 120 and 144 degrees between the first blade and the second blade longitudinal axes and between the second blade and the third blade longitudinal axes; and
  c) a straight blade driver.

31. The fastener as recited in claim 25 with said head further comprising two additional slots wherein said additional slots each have a longitudinal axis with a 72 degrees angular separation on either side of the longitudinal axis of the second slot.

32. The fastener as recited in claim 31 wherein said fastener head has slots adapted to receive a 3-blade driver, with blades 120 degrees apart, a 5-blade driver, with blades 72 drgrees apart, or a straight blade driver.

33. A fastener-driver comprising a shank terminating at a center point, and a first blade, a second blade, and a third blade, extending radially from said center point, wherein said blades each have a longitudinal axis wherein angles between adjacent longitudinal axes are different.

34. The fastener-driver as recited in claim 33 further comprising two additional blades emanating from said center point wherein said additional blades each have a longitudinal axis with a 72 degrees angular separation on either side of the longitudinal axis of the second blade.

35. The fastener-driver as recited in claim 33 wherein said driver further comprises a socket emanating from said shaft.

36. The fastener-driver as recited in claim 33 further comprising a cavity at said center point.

* * * * *